US011143765B2

United States Patent
Orejas et al.

(10) Patent No.: US 11,143,765 B2
(45) Date of Patent: Oct. 12, 2021

(54) REDUCING BIAS IMPACT ON GNSS INTEGRITY

(71) Applicant: Honeywell International Inc., Morris Plains, NJ (US)

(72) Inventors: Martin Orejas, Brno (CZ); Jakub Skalicky, Brno (CZ); Jussi Raasakka, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 244 days.

(21) Appl. No.: 16/394,988

(22) Filed: Apr. 25, 2019

(65) Prior Publication Data

US 2020/0341153 A1 Oct. 29, 2020

(51) Int. Cl.
*G01S 19/40* (2010.01)

(52) U.S. Cl.
CPC .................................... *G01S 19/40* (2013.01)

(58) Field of Classification Search
CPC .......... G01S 19/40; G01S 19/42; G01S 19/09; G01S 19/48; G01S 19/05
USPC .................................................... 342/357.23
See application file for complete search history.

(56) References Cited

U.S. PATENT DOCUMENTS

| 7,956,802 | B1 | 6/2011 | Hwang et al. |
| 9,547,086 | B2 | 1/2017 | Dunik et al. |
| 10,197,678 | B1 | 2/2019 | Wang et al. |
| 10,247,573 | B1* | 4/2019 | Gavrilets ............... B64D 47/08 |
| 2009/0150074 | A1 | 6/2009 | Vanderwerf |
| 2011/0291881 | A1 | 12/2011 | Shirai |
| 2013/0050020 | A1* | 2/2013 | Peck ....................... G01S 19/15 342/357.27 |
| 2014/0292574 | A1* | 10/2014 | Dunik ..................... G01S 19/20 342/357.58 |
| 2015/0355339 | A1* | 12/2015 | Van Den Bossche .. G01S 19/22 342/357.61 |
| 2018/0259648 | A1* | 9/2018 | Skalicky ................. G01S 19/20 |
| 2019/0049590 | A1 | 2/2019 | Bartolone et al. |
| 2019/0187295 | A1* | 6/2019 | Lee ......................... G01S 19/15 |
| 2020/0326428 | A1* | 10/2020 | Kana ....................... G01S 19/15 |

OTHER PUBLICATIONS

"2001 Federal Radionavigation Systems", Department of Defense and Department of Transportation, 2001, pp. 1 through 126.
European Patent Office, "Extended European Search Report from EP Application No. 20169218.3", from Foreign Counterpart to U.S. Appl. No. 16/394,988, dated Sep. 10, 2020, pp. 1 through 9, Published: EP.

(Continued)

*Primary Examiner* — Harry K Liu
(74) *Attorney, Agent, or Firm* — Fogg & Powers LLC (57) ABSTRACT

Systems and methods for reducing bias impact on GNSS integrity are described herein. In certain embodiments, a method includes determining a phase of travel of a vehicle. The method also includes determining a probability of hazardously misleading information (PHMI) for the corresponding phase of travel. Further, the method includes determining a protection level (PL) using based on the PHMI, wherein the PL is calculated based on a standard deviation of position error plus a standard deviation of bias along an axis of interest. Additionally, the method includes comparing the protection level against an alert limit.

20 Claims, 3 Drawing Sheets

(56) References Cited

OTHER PUBLICATIONS

Blanch et al., "Advanced RAIM User Algorithm Description: Integrity Support Message Processing, Fault Detection, Exclusion, and Protection Level Calculation", Proceedings of the 25th International Technical Meeting of the Satellite Division of the Institute of Navigation (ION GNSS), Sep. 2012, pp. 1-23.
Enge, "Multi-constellation Navigation for Air & Sea: Advanced Receiver Autonomous Integrity Monitoring", Standford University, Oct. 30, 2015, pp. 1-16.
Orejas et al., "Clustered ARAIM", ION ITM, 2016, pp. 1-22, Honeywell International Inc.
Phelts et al., "Signal Deformation Monitoring for Dual-Frequency WAAS", ION International Technical Meeting, Jan. 2013, pp. 1-25, San Diego, CA.

* cited by examiner

REDUCING BIAS IMPACT ON GNSS INTEGRITY

BACKGROUND

A global navigation satellite system (GNSS) is a system of space-based satellites that provide autonomous geo-spatial positioning with global coverage. Generally, a GNSS allows receivers to determine their location using time signals transmitted along a line-of-sight from the satellites. The Global Positioning System (GPS) is a GNSS that is maintained by the United States government and can be used by anyone with a GPS receiver. Similarly, GLONASS is a navigation satellite system maintained by Russia. The Galileo system is another GNSS developed by the European Union (EU) and European Space Agency (ESA). COMPASS is a navigation satellite system developed by China.

A GNSS provides location information anywhere on or near the Earth where there is an unobstructed line of sight to four or more GNSS satellites. A processor coupled to the GNSS receiver uses at least four of the distances from the receiver to the satellites, known as pseudoranges, to accurately approximate the position of the receiver. The accuracy of the approximate position, or position solution, varies as changing atmospheric conditions affect signal-to-noise ratios and signal transit times. The accuracy also varies as the orbiting satellites occasionally experience protracted failures during which they continue to operate while providing erroneous or extra-noisy signals. These and other factors appear as random noise in the transmitted signals, random errors in the computed pseudoranges, and ultimately as a random error in the position solution itself.

Aircraft navigation systems based on the GNSS typically include a subsystem for integrity monitoring. Integrity is a measure of the trust that can be placed in the correctness of the information supplied by the navigation system. Integrity includes the ability of a system to provide timely (within limits specified by the time-to-alert) and valid warnings to the user when the system must not be used for the intended operation (or phase of travel). As part of these warnings, the system may calculate one or more protection levels. For the integrity to be considered available for a particular phase of travel, the protection level shall be less than the alert limit specified for that phase of travel. If the protection level exceeds the allowed alert limit, the navigation system is not able to provide the desired integrity. The integrity monitoring function performed by the system may also include the capability to detect faults that cause the resulting navigation solution error to exceed the computed protection levels. Upon detection of such a fault the system may raise an alert declaring an integrity failure and attempt to exclude the GNSS measurements that are affected by the fault or combination of faults.

SUMMARY

Systems and methods for reducing bias impact on GNSS integrity are described herein. In certain embodiments, a method includes determining a phase of travel of a vehicle. The method also includes determining a probability of hazardously misleading information (PHMI) for the corresponding phase of travel. Further, the method includes determining a protection level (PL) using based on the PHMI, wherein the PL is calculated based on a standard deviation of position error plus a standard deviation of bias along an axis of interest. Additionally, the method includes comparing the protection level against an alert limit.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

As stated above and used herein, integrity is a measure of the level of trust that can be placed in the correctness of the information supplied by a navigation system. A system that performs integrity monitoring may monitor the integrity of the various measurements during the operation of the navigation system. To perform integrity monitoring, systems may implement integrity monitoring algorithms.

In certain embodiments, integrity monitoring algorithms are based on a solution separation methodology. In a solution separation methodology, a system determines a full solution and one or more subsolutions, where the full solution is calculated based on information acquired from a full set of measurements from available information sources and the subsolutions are calculated based on information acquired from subsets of the full set of measurements from the available information sources. Using the full solution and the subsolution, their covariances, and the covariances of the separation between them, a system may determine the integrity of the full solution.

The solution separation methodology, described above, may be used to determine the integrity of a position solution calculated from information acquired from navigation satellites. For example, the main position solution may incorporate a set of pseudoranges from available satellites that are corrected using available correction data from the same satellite, a different satellite, or a ground transmitter, where the subsolutions are based on a subset of the pseudoranges from the available satellites. The system may then determine the integrity or protection levels for the main position solution based on differences or separations between the full position solution and the subsolutions.

As used herein, a protection level may refer to a statistical bound to the position error of a position solution that is calculated using the information from the navigation satellites. The protection level may define the distance between the edge of a region and the true position of a vehicle that is assured to contain the indicated position of the vehicle with certain defined probability. Accordingly, the protection level defines a region where the missed alert and false alert requirements are met. Further, the protection level is not affected by actual measurements and the value of the protection level is predictable given reasonable assumptions regarding the expected error characteristics.

In some implementations, the pseudoranges may be subject to certain biases due to multiple factors that may include signal deformation, biases induced by antennas, biases due to imperfect filters, etc. The different biases may be combined to determine the worst case possible combination of biases on each subsolution. Thus, the projection of biases that has the largest impact on the position along the axis of interest (horizontal, vertical, etc.), is taken into account. The projection of biases may then be added to the subsolution error term that fulfills the allocated probability of missed detection.

In certain embodiments, assuming the worst case of bias combinations for the pseudorange measurements may safely upper bound the computed protection level. However, using the worst case combination of biases may also be overly conservative and may unnecessarily limit the provided integrity. To avoid the unnecessary limiting of provided integrity, the impact on the subsolution position of the biases may be approximated by a normal distribution. By approximating the impact of the biases with a normal distribution, calculated protection levels are significantly lower while still providing the desired safety protections during operation.

Figure 1:
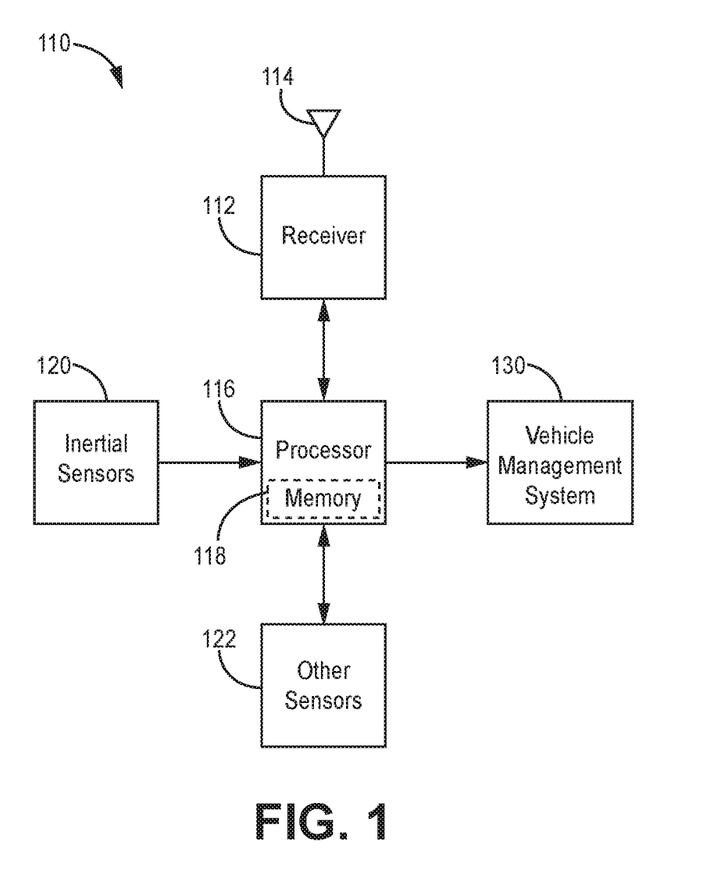
FIG. 1 is a block diagram illustrating an exemplary system for reducing bias impact on GNSS integrity according to an aspect of the present disclosure.

FIG. 1 illustrates a navigation system 110 according to one embodiment, which can implement methods for reducing bias impact on GNSS integrity described herein. The navigation system 110 may be mounted to a vehicle, such as an aircraft, spacecraft, automobile, or other mobile vehicle. Additionally, the navigation system 110 may acquire navigation information from one or more different sources. To process the acquired navigation information, the navigation system 110 may include at least one processor 116 and at least one memory unit 118.

In certain embodiments, the navigation system 110 may acquire navigation information that includes inertial motion information and GNSS measurements. To acquire the inertial motion information, the navigation system 110 may include inertial sensors 120 that measure and sense the inertial motion of the vehicle containing the navigation system 110. To acquire the GNSS measurements, the navigation system 110 may include a satellite receiver 112 with at least one antenna 114 that receives satellite signals from GNSS satellites. Additionally, the navigation system 110 may include one or more other sensors 122, which may provide additional sensor data to the processor 116. Examples of other sensors 122 may include an altitude sensor, an electro-optical sensor, a magnetometer, distance measuring instruments, among others.

During operation, the satellite receiver 112 may receive satellite signals such as GNSS signals, extract the satellite position and time data from the signals, and provide pseudorange measurements to the processor 116. From the pseudorange measurements and the inertial measurements, the processor 116 may derive a position, velocity, and attitude solution. The processor 116 may also use the pseudorange measurements to detect satellite transmitter failures and to determine a worst-case error, or protection level. The processor 116 may then provide the protection level, along with the position solution to a vehicle management system 130. The vehicle management system 130 may compare the protection level to an alarm limit for the particular vehicle containing the navigation system 110.

The processor 116 or other computational devices used in the present system and methods may be implemented using software, firmware, hardware, or any appropriate combination thereof. The processor 116 and other computational devices may be supplemented by, or incorporated in, specially-designed application-specific integrated circuits (ASICs) or field programmable gate arrays (FPGAs). In some implementations, the processor 116 and/or other computational devices may communicate through an additional transceiver with other computing devices outside of the navigation system 110. The processor 116 and other computational devices can also include or function with software programs, firmware, or other computer readable instructions for carrying out various process tasks, calculations, and control functions used in the present methods and systems.

The present methods may be implemented by computer executable instructions, such as program modules or components, which are executed by at least one processor 116. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, the processor 116 may receive GNSS signals and calculate integrity monitoring parameters using a solution separation methodology. Examples of solution separation methodologies may include receiver autonomous integrity monitoring (RAIM) or advanced receiver autonomous integrity monitoring (ARAIM). As described above, in a solution separation methodology, a set of test statistics may be formed by the difference between a computed full-solution position and each computed subsolution position. The processor 116 may calculate a set of decision thresholds based on the statistics of the separation between the full-solution position and the subsolution positions. The full-solution position provides position estimates computed using all available satellite measurements (pseudoranges). In comparison, the set of subsolutions provide the estimate using subsets of available satellite measurements defined according to specified fault states. For example, under the assumption that only one satellite can be in fault at any given time and N satellite measurements are available, there will be N statistics to be tested and N subsolutions where each subsolution position is computed by removing one different measurement associated with an excluded satellite. Alternatively, the subsolutions may also be calculated for subsets of the possible satellites that allow for more than one satellite being in a fault state at any given time. In which case, there will be more than N subsolutions. The solution separation methodology is thus an integrity method working in the position domain and can be used by the processor 116 in the navigation system 110 to determine the integrity of the measured parameters acquired from the pseudoranges.

During operation of the navigation system 110, the receiver 112 may receive satellite signals such as GNSS signals, extract the satellite position and time data from the signals, and provide pseudorange measurements to the processor 116. From the pseudorange measurements and the optional inertial or other measurements from the inertial sensors 120 and other sensors 122, the processor 116 may derive position, velocity, and attitude solutions, such as by using a Kalman filter. The processor 116 can also use the pseudorange measurements to detect satellite transmitter failures and to determine the protection level. In some implementations, the processor 116 may calculate a horizontal protection level (HPL) for position, a vertical protection level (VPL) for position, a horizontal protection level for velocity (VHPL), a vertical protection level for velocity (VVPL), protection levels for roll, pitch, and yaw (heading) angles (RPL, PPL, YPL, respectively), and/or other navigational parameters. With respect to the HPL, the HPL is the radius of a circle in the horizontal plane which describes the region that is assured to contain the indicated horizontal position. The HPL is a horizontal region for which predetermined missed alert and false alert requirements are met and is a function of the satellite and user geometry and the expected error characteristics.

When the vehicle containing the navigation system 110 is an aircraft, depending on the phase of flight, the VPL, VHPL, VVPL, attitude and heading PLs (i.e., RPL, PPL, and YPL), and/or other parameters may also be computed by the processor 116. For the integrity to be considered available for a particular phase of flight or travel, the protection level should be less than the alert limit specified for that phase of travel. If the protection level exceeds the allowed alert limit, the navigation system is not able to provide the desired integrity. For example, the processor 116 may compare the horizontal and/or vertical protection levels to an alert limit corresponding to a particular aircraft flight phase, in some embodiments. In other embodiments, the processor 116 outputs the protection levels to another system such as a flight management system for further analysis.

In some embodiments, when the protection level exceeds an alarm limit, the processor 116 may deem that the measurements do not have enough integrity to perform a specific procedure associated with a phase of travel for the vehicle containing the navigation system 110. When there is not enough integrity, the navigation system 110 may switch to a reversionary mode. As used herein, a reversionary mode may refer to a mode of operation that a vehicle may pursue when the measurements do not have sufficient integrity to operate as intended. For example, a reversionary mode may include using measurements from other sensors like the inertial sensors 120 and the other sensors 122. Also, the reversionary mode may involve abandoning the procedure associated with the particular phase of travel. Alternatively, the reversionary mode may involve providing control of the vehicle to a manual operator, such as an aircraft pilot.

As described above, one output of a solution separation method is the protection level. To avoid entering reversionary modes when possible, it is desirable to have as low of a protection level as possible. When calculating the protection level, the biases on the pseudorange measurements may be taken into account. In certain embodiments, there may be multiple biases on the pseudorange measurements. For example, possible sources of pseudorange biases may include biases from signal deformation, biases induced by the antenna, biases due to imperfect filters, among other sources of biases. To account for the various biases, the processor 116 may assume that the sign of each pseudorange bias is random. As there are n pseudoranges, there are $2^n$ possible sign combinations, where each sign is substantially equally probable and each has a particular impact on the position computation. Consequently, a distribution of the impact of the signs of the biases can be drawn and, per the central limit theorem, converges to the Gaussian distribution with zero mean and a certain variance.

Further, the error in each subsolution (without considering the impact of biases) may be considered normally distributed and, accordingly, may be described by its error covariance or standard deviation. In contrast to calculating the worst-case combination of biases when determining the impact of the biases on the subsolution position, the impact of the biases on the sub solution position may be approximated by a normal distribution. The normal distribution of the subsolution error and the normal distribution of the impact of the biases may be added together when computing the subsolution error term and the allocated probability of missed detection. In some embodiments, to ensure that the normal distribution approximation of the impact of the biases is properly upper-bounded, the variance of the distribution of the impact of the biases may be increased. For example, the variance may be increased by 5% or some other bounding factor to ensure that the cumulative distribution function of the impact of the biases is sufficiently upper-bounded.

By calculating the protection level using the normal distribution of the impact of the biases and the normal distribution of the subsolution error, the processor 116 may calculate significantly lower protection levels as compared to protection levels calculated using the worst case combination of biases. For example, under certain scenarios, the calculated protection levels using the normal distributions may be on average 18.51% lower than the protection levels calculated with the worst case combination of biases. Further, the use of the normal distributions satisfies safety concerns as it relies on probabilistic distributions to characterize error behavior.

Figure 2:
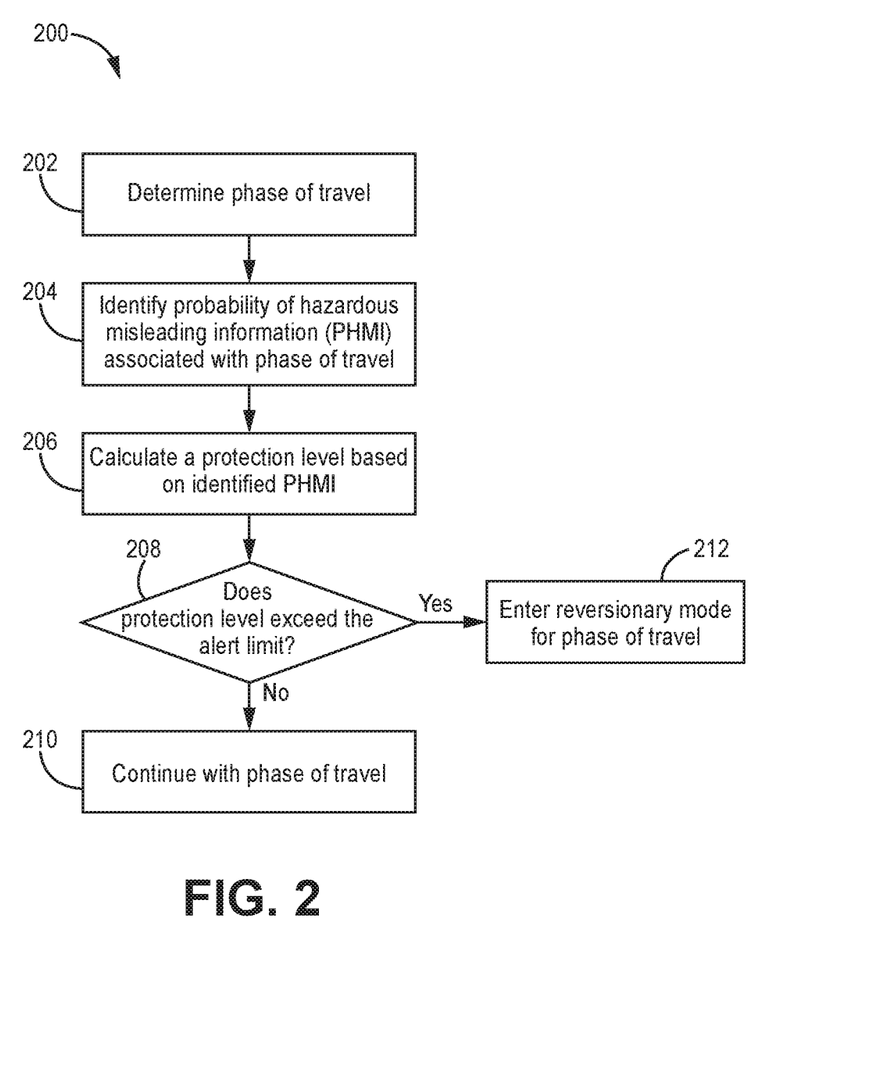
FIG. 2 is a flowchart diagram illustrating an exemplary method for reducing bias impact on GNSS integrity according to an aspect of the present disclosure.

FIG. 2 is a flow diagram of an exemplary method 200 for reducing the impact of biases on GNSS integrity. As described herein, the method 200 may be performed by the processor 116. However, the method 200 may be performed by a different processor on the navigation system 110, or other processor that is part of a system in communication with the navigation system 110. In certain embodiments, method 200 proceeds at 202, where the phase of travel is determined. As described above, navigation system 110 may be on a vehicle that experiences different phases of travel. For example, if the vehicle is an automobile, the vehicle might have different phase of travel for parking and driving. Alternatively, if the vehicle is an aircraft, the vehicle may have different phases of travel for taking off, flying, landing, and the like.

When the phase of travel for the vehicle containing the navigation system 110 has been determined, the method 200 proceeds at 204, where a probability of hazardously misleading information (PHMI) is identified, where the identified PHMI is associated with the determined phase of travel.

As used herein, the PHMI may refer to a probability that there is an undetected error in the computed output that exceeds the protection level and thus may be hazardous to the operation of the vehicle. Accordingly, certain phases of travel may have different allowed PHMIs according to the critical consequences that an error might cause in that particular phase of travel. For example, when the vehicle containing the navigation system 110 is an aircraft, the PHMI may be higher when the phase of travel is oceanic flight as compared to when the phase of travel is landing.

When the PHMI associated with the identified phase of travel is identified, the method 200 may proceed at 206, where a protection level is calculated based on the identified PHMI. To calculate the protection level, the processor 116 may use the following equation to iteratively solve for the protection level:

$$Q\left(\frac{PL}{\sigma_0}\right) + \sum_{i=1}^{Nss} P_{fault,i} \cdot Q\left(\frac{PL - T_i}{\sigma_{new,i}}\right) = PHMI.$$

As shown in the above equation, the PL represents the protection level and the PHMI represents the probability of hazardously misleading information. The Q (•) represents the complementary error function. Additionally, the $\sigma_0$ represents the standard deviation of position error plus the standard deviation of the bias of a solution using the full set of measurements, where the full set of measurements includes the measurements from all the satellites that are visible to the receiver 112.

In further embodiments, the $N_{SS}$ term may refer to the number of subsolutions that are calculated with the solution separation methodology where i may refer to a particular subsolution. The term $P_{fault,i}$ may refer to the probability of a fault mode for a particular subsolution. As used herein the fault probability may refer to the probability of failure for the satellites that are excluded from a particular subsolution. When there is one satellite excluded from a particular subsolution, the fault probability may refer to the probability that that the excluded satellite is in a fault state. Further, when there are two satellites excluded from a particular subsolution, the fault probability may refer to the probability that both satellites are simultaneously in a fault state. Additionally, the $T_i$ may refer to a threshold limit for the difference between the full solution and the particular subsolution given that there are no errors.

In additional embodiments, the $\sigma_{new,i}$ term may refer to the standard deviation of position error plus bias along an axis of interest. For example, the variance $\sigma_{new,i}^2$ may be equal to $\sigma_i^2 + \sigma^{(i)2}$, which is the variance of the position for a particular subsolution $\sigma^{(i)2}$ plus the variance of the biases $\sigma_i^2$. In some implementations, the variance of the biases may be treated as a Gaussian distribution that has variance as follows:

$$\sigma_i^2 = 1.05\sqrt{\Sigma S_i(k)^2}.$$

As shown, the $S_i(k)^2$ may refer to a matrix that defines the projection of pseudorange errors into the navigation solution 112. Further, the variance may be multiplied by a bounding factor to increase the variance to ensure that the impact of the biases is properly upper-bounded. For example, the variance may be multiplied by a bounding factor of 1.05 or 5% to ensure that the variance is properly upper-bounded. While 5% is shown, the variance may be multiplied by bounding factors other than 5%. Accordingly, the processor 116 may iteratively calculate the protection level for a GNSS system using the variance of the biases as compared to a worst case combination of the biases, leading to a lower protection level while still safely limiting the protection level.

When the method 200 has calculated the protection level, the method 200 proceeds at 208, where it is determined whether the protection level exceeds an alert limit. If the protection level does not exceed the alert limit, then the method 200 proceeds at 210, where the phase of travel is continued. For example, if the protection level is less than the alert limit, then the position computed from GNSS measurements may have sufficient integrity to proceed with the phase of travel.

In certain implementations, if the protection level exceeds the alert limit, then the method 200 proceeds at 212, where a reversionary mode is entered for the phase of travel. When the navigation system 110 enters a reversionary mode, the navigation system 110 may stop using the GNSS measurements for the particular phase of travel and rely on other instrumentation. For example, the navigation system 110 may rely on the inertial sensors 120 and the other sensors 122 to complete procedures associated with the phase of travel. Also, the navigation system 110 may abandon or adjust procedures associated with the phase of travel. For example, when the procedure associated with the phase of travel is a landing procedure, the navigation system 110 may abandon the landing procedure or direct a pilot to rely on visual landing aids when landing the vehicle. However, as the protection level is calculated using the variance of the combined biases, the protection level may exceed the alert limit with less frequency than when the protection level is calculated using the worst case combination of the biases. Thus, the navigation system 110 may enter reversionary modes with less frequency.

Figure 3:
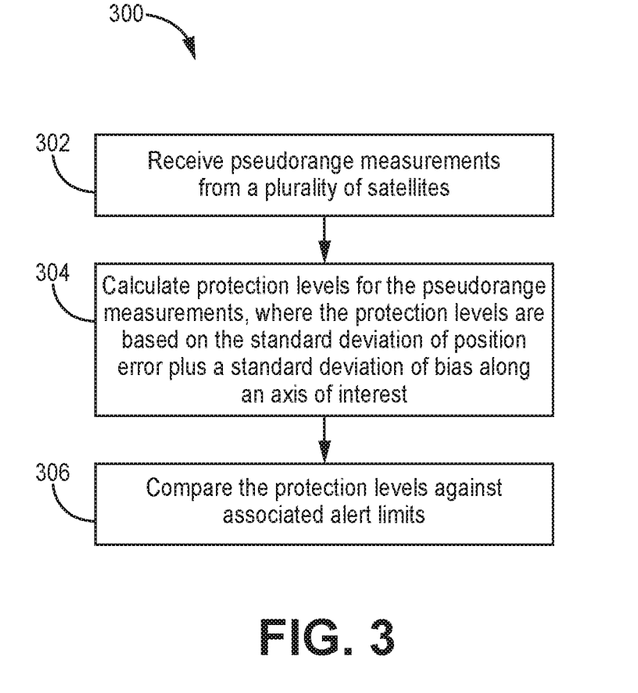
FIG. 3 is a flowchart diagram illustrating an additional exemplary method for reducing bias impact on GNSS integrity according to an aspect of the present disclosure.

FIG. 3 is a flowchart diagram illustrating an additional exemplary method 300 for reducing bias impact on GNSS integrity. The method 300 proceeds at 302, where pseudorange measurements are received from a plurality of satellites. For example, a navigation system 110 may receive pseudorange measurements from multiple satellites. When the pseudorange measurements are received, the method 300 may proceed at 304, where protection levels are calculated for the pseudorange measurements. As described herein, when the protections levels are calculated, a processor 116 may use the standard deviation of position error plus a standard deviation of bias along an axis of interest to calculate a protection level instead of a worst case combination of biases. When the protection level is calculated, the method 300 may proceed at 306, where the protection levels are compared against an associated alert limit. By comparing the protection level against an alert limit, the navigation system 110 may determine whether the pseudorange measurements have sufficient integrity to be relied upon.

Example Embodiments

Example 1 includes a method comprising: determining a phase of travel of a vehicle; determining a probability of hazardously misleading information (PHMI) for the corresponding phase of travel; determining a protection level (PL) using based on the PHMI, wherein the PL is calculated based on a standard deviation of position error plus a standard deviation of bias along an axis of interest; and comparing the protection level against an alert limit.

Example 2 includes the method of Example 1, wherein determining the PL further comprises using the equation $$Q\left(\frac{PL}{\sigma_{new,0}}\right) + \sum_{i=1}^{N_{ss}} P_{fault,i} \cdot Q\left(\frac{PL - T_i}{\sigma_{new,i}}\right) = PHMI;$$

wherein Q(•) is a complementary error function; wherein $N_{SS}$ is a number of different position solutions computed using a subset of a full set of measurements; wherein $P_{fault,i}$ is a probability of fault mode i; wherein $T_i$ is a fault detection threshold on fault mode i; wherein $\sigma_{new,0}$ is a standard deviation of position error plus bias of a solution using the full set of measurements; wherein each position solution using the subset of the full set of measurements is characterized by $\sigma_{new,i}$; and wherein $\sigma_{new,i}$ is a standard deviation of position error plus a standard deviation of bias along an axis of interest.

Example 3 includes the method of any of Examples 1-2, further comprising entering a reversionary mode for the phase of travel when the PL exceeds the alert limit.

Example 4 includes the method of any of Examples 1-2, further comprising upper-bounding the standard deviation of bias.

Example 5 includes the method of Example 4, wherein upper-bounding the standard deviation of bias comprises multiplying a variance of bias along the axis of interest by a bounding factor.

Example 6 includes the method of Example 5, wherein the variance of bias along the axis of interest is calculated using the equation $bf\sqrt{\Sigma S_i(k)^2}$, wherein bf is the bounding factor and $S_i(k)$ defines one or more projections of pseudorange errors into the navigation solution.

Example 7 includes the method of Example 6, wherein the vehicle receives information from a plurality of GNSS satellites.

Example 8 includes the method of any of Examples 1-7, wherein the vehicle is an aircraft.

Example 9 includes a system comprising: a receiver configured to receive a plurality of signals transmitted from a plurality of transmitters; and a processor operatively coupled to the receiver, the processor configured to perform a method of integrity monitoring, wherein the executable instructions cause the processor to: determine a phase of travel of a vehicle; determine a probability of hazardously misleading information associated with the phase of travel; calculate a protection level associated with the probability of hazardously misleading information, wherein the protection level is calculated based on a standard deviation of position error plus a standard deviation of bias along an axis of interest.

Example 10 includes the system of Example 9, wherein the processor calculates the protection level using the equation $$Q\left(\frac{PL}{\sigma_{new,0}}\right) + \sum_{i=1}^{N_{ss}} P_{fault,i} \cdot Q\left(\frac{PL - T_i}{\sigma_{new,i}}\right) = PHMI;$$

wherein Q(•) is a complementary error function; wherein $N_{SS}$ is a number of different position solutions computed using a subset of a full set of measurements; wherein $P_{fault,i}$ is an onset probability of fault mode i; wherein $T_i$ is a fault detection threshold on fault mode i; wherein $\sigma_{new,0}$ is a standard deviation of position error plus the bias of a solution using the full set of measurements; wherein each position solution using the subset of the full set of measurements is characterized by $\sigma_{new,i}$; and wherein $\sigma_{new,i}$ is a standard deviation of position error plus a standard deviation of the bias along an axis of interest.

Example 11 includes the system of any of Examples 9-10, wherein the executable instructions further cause the processor to compare the protection level to an alert limit.

Example 12 includes the system of Example 11, wherein the system enters a reversionary mode for the phase of travel when the protection level exceeds the alert limit.

Example 13 includes the system of any of Examples 9-12, wherein the standard deviation of the bias is upper-bounded.

Example 14 includes the system of Example 13, wherein the standard deviation of the bias is upper-bounded by multiplying a variance of the bias by a bounding factor.

Example 15 includes the system of Example 14, wherein the variance of bias is calculated using the equation $\sigma_i^2 = bf\sqrt{\Sigma S_i(k)^2}$, wherein bf is the bounding factor and $S_i(k)$ defines one or more projections of pseudorange errors into the navigation solution.

Example 16 includes the system of any of Examples 9-15, wherein the plurality of transmitters are a plurality of GNSS satellites.

Example 17 includes the system of any of Examples 9-16, wherein the vehicle is an aircraft.

Example 18 includes a method comprising: receiving a plurality of pseudorange measurements from a plurality of satellites; calculating one or more protection levels for the plurality of pseudorange measurements, wherein the one or more protection levels are calculated based on the standard deviation of position error plus a standard deviation of bias along an axis of interest; comparing the one or more protection levels against one or more alert limits.

Example 19 includes the method of Example 18, wherein the standard deviation of the bias is upper-bounded.

Example 20 includes the method of Example 19, wherein the standard deviation of the bias is upper bounded by multiplying a variance of the bias by a bounding factor.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   determining a phase of travel of a vehicle by a processor;
   determining a probability of hazardously misleading information (PHMI) for the phase of travel by the processor;
   determining a protection level (PL) using pseudorange measurements based on the PHMI by the processor, wherein the PL is calculated based on a standard deviation of position error plus a standard deviation of bias along an axis of interest; and
   comparing the protection level against an alert limit by the processor.

2. The method of claim 1, wherein determining the PL further comprises using equation $$Q\left(\frac{PL}{\sigma_{new,0}}\right) + \sum_{i=1}^{N_{ss}} P_{fault,i} \cdot Q\left(\frac{PL - T_i}{\sigma_{new,i}}\right) = PHMI;$$

wherein Q(•) is a complementary error function;

wherein Nss is a number of different position solutions computed using a subset of a full set of measurements;

wherein $P_{fault,i}$ is a probability of fault mode i;

wherein $T_i$ is a fault detection threshold on the fault mode i;

wherein $\sigma_{new,0}$ is the standard deviation of position error plus bias of a solution using the full set of measurements;

wherein each position solution using the subset of the full set of measurements is characterized by $\sigma_{new,i}$; and wherein $\sigma_{new,i}$ is the standard deviation of position error plus the standard deviation of bias along the axis of interest.

3. The method of claim 1, further comprising entering a reversionary mode for the phase of travel when the PL exceeds the alert limit.

4. The method of claim 1, further comprising upper-bounding the standard deviation of bias.

5. The method of claim 4, wherein upper-bounding the standard deviation of bias comprises multiplying a variance of bias along the axis of interest by a bounding factor.

6. The method of claim 5, wherein the variance of bias along the axis of interest is calculated using equation $bf\sqrt{\Sigma S_i(k)^2}$, wherein bf is the bounding factor and $S_i(k)$ defines one or more projections of pseudorange errors into a navigation solution.

7. The method of claim 6, wherein the vehicle receives information from a plurality of GNSS satellites.

8. The method of claim 1, wherein the vehicle is an aircraft.

9. A system comprising:
a receiver configured to receive a plurality of signals transmitted from a plurality of transmitters; and
a processor operatively coupled to the receiver, the processor configured to perform a method of integrity monitoring, wherein executable instructions cause the processor to:
determine a phase of travel of a vehicle;
determine a probability of hazardously misleading information associated with the phase of travel; and
calculate a protection level associated with the probability of hazardously misleading information, wherein the protection level is calculated based on a standard deviation of position error plus a standard deviation of bias along an axis of interest.

10. The system of claim 9, wherein the processor calculates the protection level using equation $$Q\left(\frac{PL}{\sigma_{new,0}}\right) + \sum_{i=1}^{Nss} P_{fault,i} \cdot Q\left(\frac{PL - T_i}{\sigma_{new,i}}\right) = PHMI;$$

wherein Q(•) is a complementary error function;

wherein Nss is a number of different position solutions computed using a subset of a full set of measurements;

wherein $P_{fault,i}$ is an onset probability of fault mode i;

wherein $T_i$ is a fault detection threshold on the fault mode i;

wherein $\sigma_{new,0}$ is the standard deviation of position error plus the bias of a solution using the full set of measurements;

wherein each position solution using the subset of the full set of measurements is characterized by $\sigma_{new,i}$; and wherein $\sigma^{new,i}$ is the standard deviation of position error plus the standard deviation of the bias along the axis of interest.

11. The system of claim 9, wherein the executable instructions further cause the processor to compare the protection level to an alert limit.

12. The system of claim 11, wherein the system enters a reversionary mode for the phase of travel when the protection level exceeds the alert limit.

13. The system of claim 9, wherein the standard deviation of the bias is upper-bounded.

14. The system of claim 13, wherein the standard deviation of the bias is upper-bounded by multiplying a variance of the bias by a bounding factor.

15. The system of claim 14, wherein the variance of bias is calculated using equation $\sigma_i^2 = bf\sqrt{\Sigma S_i(k)^2}$, wherein bf is the bounding factor and $S_i(k)$ defines one or more projections of pseudorange errors into a navigation solution.

16. The system of claim 9, wherein the plurality of transmitters are a plurality of GNSS satellites.

17. The system of claim 9, wherein the vehicle is an aircraft.

18. A method comprising:
receiving a plurality of pseudorange measurements from a plurality of satellites by a processor;
calculating one or more protection levels for the plurality of pseudorange measurements by the processor, wherein the one or more protection levels are calculated based on a standard deviation of position error plus a standard deviation of bias along an axis of interest; and
comparing the one or more protection levels against one or more alert limits by the processor.

19. The method of claim 18, wherein the standard deviation of the bias is upper-bounded.

20. The method of claim 19, wherein the standard deviation of the bias is upper bounded by multiplying a variance of the bias by a bounding factor.

* * * * *